United States Patent Office 3,271,367
Patented Sept. 6, 1966

3,271,367
THERMOPLASTIC POLYCARBONATES OF DIHYDROXYDIARYLENE SULFONES AND THEIR PREPARATION
Hermann Schnell, Krefeld-Urdingen, and Heinrich Krimm and Ludwig Bottenbruch, Krefeld-Bockum, Germany, assignors to Farbenfabriken Bayer Aktiengesellschaft, Leverkusen, Germany, a corporation of Germany
No Drawing. Filed Mar. 21, 1956, Ser. No. 572,793
Claims priority, application Germany, Mar. 26, 1955, F 17,168
7 Claims. (Cl. 260—49)

It is known to produce thermoplastic materials by interesterification of dialkylcarbonates with glycols. The products have not attained any technical significance because of their low softening points.

It is further known to produce polycarbonates by reacting glycol - bis - chloroformates with polyfunctional phenols or by reacting bis-chloroformates of polyfunctional phenols with glycols. Oily to resinous products are thus obtained which have been proposed for application as plasticizers or binding agents.

Furthermore, polycarbonates have been produced by reacting polyfunctional phenols carrying several hydroxyl groups on one aromatic nucleus, e.g., hydroquinone and resorcinol, with phosgene. The polycarbonates obtained in this way are, however, insoluble in the customary solvents and decompose at their melting temperatures.

The products produced according to the processes described have not attained practical significance, on account of their properties.

Polycarbonates are obtained according to the applications Ser. No. 461,938, filed October 12, 1954, now Patent No. 3,028,365, and Ser. No. 557,256, filed January 4, 1956, as technically valuable thermoplastic materials from dimonohydroxyarylene alkanes and according to application Serial No. 572,802, now Patent No. 3,136,741, filed concurrently herewith, from mixtures of di-monohydroxyarylene alkanes with other dihydroxy compounds.

The objects of the present invention are new thermoplastic materials of the polyester type, melting at high temperatures without decomposition and having technically useful properties. The new polycarbonates are characterized by a content of residues of dihydroxydiarylene sulphones, selected from the group consisting of unsubstituted dihydroxydiarylene sulphones and dihydroxydiarylene sulphones with aliphatic side chains up to 4 carbon atoms at the aromatic rings.

The further object of the invention is a process for producing such new polycarbonates containing residues of dihydroxydiarylene sulphones.

The new polycarbonates according to the invention are high molecular weight thermoplastic synthetic materials whose softening or melting points and characteristic physical properties depend to a large extent on the type of dihydroxydiarylene sulphones used or on the type and quantity of other dihydroxy compounds also condensed. They are soluble in a series of organic solvents, e.g., in dioxane, tetrahydrofurane, cyclohexanone and methylene chloride, and can be worked up from such solutions into films or lacquer coatings. Since they are fusible without decomposition they can be made into useful shaped bodies or coatings by pressing, spraying or flame-spraying.

In the dihydroxydiarylene sulphones used for forming the polycarbonates according to the invention, the arylene residues can be the same or different. The arylene residues can furthermore carry hydrogen atoms or substituents which are incapable of taking part in the reaction to polycarbonates, e.g., alkyl groups such as ethyl, methyl, propyl or tertiary butyl.

As examples of dihydroxydiarylene sulphones of the specified type, the following may be mentioned: 4,4'-dihydroxydiphenylene sulphone, 2,2'-dihydroxydiphenylene sulphone, 3,3'-dihydroxydiphenylene sulphone, 4,4'-dihydroxy-2,2'-dimethyl-diphenylene sulphone, 4,4'-dihydroxy-3,3'-dimethyl-diphenylene sulphone, 2,2'-dihydroxy-4,4' - dimethyl - diphenylene sulphone, 4,4' - dihydroxy-2,2'-diethyldiphenylene sulphone, 4,4'-dihydroxy-3,3'-diethyl - diphenylene sulphone, 4,4'-dihydroxy-2,2'-di-tert. butyl - diphenylene sulphone, 4,4'-dihydroxy-3,3'-di-tert. butyl-diphenylene sulphone, and 2,2'-dihydroxy-1,1'-dinaphthylene sulphone. We prefer the 4,4'-dihydroxydiphenylene sulphones, mentioned above.

As examples of the other dihydroxy compounds which may be used in admixture with the dihydroxydiarylene sulphones, if desired, there may be mentioned the following: aliphatic dihydroxy compounds, such as: ethylene glycol, diethylene glycol, triethylene glycol, polyethylene glycol, the corresponding thioglycols, di- or polyglycols obtained from propylene oxide-1,2, propanediol-1,2, propanediol-1,3, butanediol-1,3, butanediol-1,4, 2-methylpropanediol-1,3, pentanediol-1,5, 2-ethylpropanediol-1,3, hexanediol-1,6, octanediol-1,8, 2-ethylhexanediol-1,3, decanediol-1,10, and o-, p- or m-xylene glycol; cycloaliphatic dihydroxy compounds, such as cyclohexanediol-1,2, cyclohexanediol-1,4, 2,2-(4,4'-dihydroxy-dicyclohexyl)-propane and 2,6-dihydroxy-decahydronaphthalene; and aromatic dihydroxy compounds, such as hydroquinone, resorcinol, pyrocatechol, 4,4'-dihydroxydiphenyl, 2,2' - dihydroxydiphenyl, 1,4 - dihydroxynaphthalene, 1,6 - dihydroxynaphthalene, 2,6-dihydroxynaphthalene, 1,2-dihydroxynaphthalene, 1,5-dihydroxyanthracene, 2,2'-dihydroxydinaphthalene-1,1', and o-, m-, or p-hydroxybenzylalcohol, and especially di-monohydroxy- arylene alkanes, such as 4,4'-dihydroxy-diphenylene-methane,
1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4'-dihydroxy-diphenylene)-(4-methyl-phenylene)-methane,
(4,4'-dihydroxy-diphenylene)-(4-ethyl-phenylene)-methane,
(4,4'-dihydroxy-diphenylene)-(4-isopropyl-phenylene)-methane,
(4,4'-dihydroxy-diphenylene)-(4-butyl-phenylene)-methane,
(4,4'-dihydroxy-diphenylene)-benzyl-methane,
(4,4'-dihydroxy-diphenylene)-α-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane (melting point 149–150° C.),
2,2-(4,4'-dihydroxy-diphenylene)-4-methyl-pentane,
2,2(4,4'-dihydroxy-diphenylene)-heptane (boiling point 198–200° C. under 0.3 mm. mercury gauge),
2,2-(4,4'-dihydroxy-diphenylene)-octane,
2,2-(4,4'-dihydroxy-diphenylene)-nonane (melting point 68° C.),
1,1-(4,4'-dihydroxy-diphenylene)-1-phenyl-ethane,
(4,4'-dihydroxy-diphenylene)-1-(α-furyl)-ethane,
3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2-(4,4'-dihydroxy-diphenylene)-decahydronaphthalene, (melting point 181° C.),
2,2-(4,4'-dihydroxy-3,3'-dicyclohexyl-diphenylene)-propane (melting point 144–146° C.), 2,2-(4,4'-dihydroxy-3-methyl-diphenylene)-propane
(melting point 114° C.),
2,2-(4,4'-dihydroxy-3-isopropyl-diphenylene)-
butane,
1,1-(4,4'-dihydroxy-3,3'-dimethyl-diphenylene)-
cyclohexane,
2,2-(4,4'-dihydroxy-3,3'-dibutyl-diphenylene)-
propane,
2,2-(4,4'-dihydroxy-3,3'-diphenyl-diphenylene)-
propane,
2,2-(4,4'-dihydroxy-2,2'-dimethyl-diphenylene)-
propane,
1,1-(4,4'-dihydroxy-3,3'-dimethyl-6,6'-dibutyl-di-
phenylene)-butane,
1,1-(4,4'-dihydroxy-3,3'-dimethyl-6,6'-di-tert.butyl-
diphenylene)-ethane,
1,1-(4,4'-dihydroxy-3,3'-dimethyl-6,6'-di-tert.butyl-
diphenylene)-propane,
1,1-(4,4'-dihydroxy-3,3'-dimethyl-6,6'-di-tert.butyl-
diphenylene)-butane,
1,1-(4,4'-dihydroxy-3,3'-dimethyl-6,6'-di-tert.butyl-
diphenylene)-isobutane,
1,1-(4,4'-dihydroxy-3,3'-dimethyl-6,6'-di-tert.butyl-
diphenylene)-heptane,
1,1-(4,4'-dihydroxy-3,3'-dimethyl-6,6'-di-tert.butyl-
diphenylene)-1-phenyl-methane,
1,1-(4,4'-dihydroxy-3,3'-dimethyl-6,6'-di-tert.butyl-
diphenylene)-2-methyl-2-pentene,
1,1-(4,4'-dihydroxy-3,3'-dimethyl-6,6'-di-tert.butyl-
diphenylene)-2-ethyl-2-hexene, and
1,1-(4,4'-dihydroxy-3,3'-dimethyl-6,6'-di-tert.amyl-
diphenylene)-butane.

The process according to the present invention for producing the new polycarbonates consists in reacting said dihydroxy-diarylene sulphones or mixtures thereof with the aforementioned dihydroxy compounds or mixed diesters of the aforementioned sulphones and of the aforementioned dihydroxy compounds with carbonic acid derivatives selected from the group consisting of diesters of carbonic acid, especially diarylesters, phosgene, and bis-chlorocarbonic acid esters of the aforesaid dihydroxydiaryl sulphones and of the other dihydroxy compounds.

Thus it is possible to produce the new polycarbonates by interesterifying dihydroxydiarylene sulphones, optionally mixed with the aforesaid dihydroxy compounds and suitably in the presence of acidic or basic catalysts with dialkyl, dicycloalkyl, or diaryl carbonates, such as dimethyl-, diethyl-, dipropyl-, dibutyl-, diamyl-, dioctyl-, dicyclohexyl-, and especially with the diphenyl- and di-o-, m- or p-toluyl carbonate, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o-, m- or p-toluyl and the cyclohexyl-phenyl carbonate; also with mixed bis-carbonates of monohydroxy compounds mentioned above and of the aforesaid dihydroxy-diarylene sulphones of the type: bis-(hydroxyarylene-aryl or -cycloalkyl or -alkyl)-sulphone, particularly at elevated temperatures from about 50–330° C. and especially from about 120 to about 290° C. under reduced pressure for instance up to 0.1 mm. mercury gauge.

By re-esterifying the mentioned carbonic acid diesters, the corresponding alkyl or cycloalkyl alcohols or the corresponding phenols are split off.

The re-esterifying process has to be carried out while excluding oxygen. We prefer to pass an inert-gas such as hydrogen, nitrogen, or carbon dioxide gas through the melt.

The re-esterification may be activated by re-esterifying catalysts, such as inorganic bases, for example caustic soda and potassium hydroxide, high boiling organic bases, such as acridine, metal hydrides, such as lithium and calcium hydride, alkali or alkaline earth metals, such as sodium, potassium, magnesium, and calcium, metal oxides, such as zinc oxide, aluminium oxide, lead oxide, antimonotrioxide, cerium oxide, and boron oxide, acids, such as phosphoric acid and p-toluene sulphonic acid, and salts, such as sodium benzoate, calcium acetate, and boron phosphate, and alcoholates and phenolates.

The new polycarbonates can also be produced by introducing phosgene into solutions of dihydroxy-diarylene sulphones, or of these sulphones in mixture with the aforesaid dihydroxy compounds in organic bases, such as dimethylaniline, diethylaniline, trimethylamine, and pyridine, or in indifferent organic solvents, such as petrol, ligroin, cyclohexane, methylcyclohexane, benzene, toluene, xylene, chloroform, methylene chloride, carbon tetrachloride, trichloroethylene, di-chloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy-diarylene sulphones or mixtures containing them, preferably in the presence of an excess of a base, such as lithium, sodium, potassium, and calcium hydroxide or carbonate. The polycarbonates then precipitate out from the aqueous solution.

The conversion in the aqueous solution is promoted by the addition of reaction-inert solvents of the kind mentioned above which are capable of dissolving phosgene and eventually the produced polycarbonate.

The phosgene may be used in an equivalent amount. Generally, however, it is preferable to use an excess of the phosgene. Suitable temperatures are from about 0° C. to about 100° C.

Finally it is also possible to react bis-chlorocarbonates of dihydroxydiarylene sulphones, optionally mixed with the aforementioned other dihydroxy compounds, optionally also with mixtures of such dihydroxy compounds and with dihydroxydiarylene sulphones. The condensation proceeds suitably in the presence of inert solvents and acid-binding materials, e.g. tertiary amines.

When using phosgene or bis-chlorocarbonic acid esters as derivatives of the carbonic acid in producing polycarbonates according to the invention catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethyl ammoniumhydroxide, triethyloctadecylammoniumchloride, trimethyl-benzylammoniumfluoride, triethylbenzylammoniumchloride, dimethyldodecylammoniumchloride, dimethylbenzylphenylammoniumchloride, trimethylcyclohexylammoniumbromide, and N - methylpyridiniumchloride, in amounts from about 0.05 to about 5 percent by weight. These compounds may be added to the reaction mixture before or during the reaction.

Further in some of these cases we prefer to add surface active agents, such an alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

In the production of polycarbonates according to the various processes is further is advantageous to employ small amounts of reducing agents, for example sodium or potassium sulphide, sulphite, and dithionite, or free phenol and p-tert.butyl-phenol.

By adding monofunctional compounds which are capable of reacting with phosgene or with the end groups of the polycarbonates which terminate the chains being formed, it is possible to regulate the molecular weight of the polycarbonates within wide limits. Such monofunctional compounds are phenols, e.g. phenol, tert.

butylphenol, cyclohexylphenol, and 2,2-(4-hydroxyphenylene-4'-methoxyphenylene)-propane, aniline and methylaniline.

The following examples are given for the purpose of illustrating the invention, the parts being by weight.

Example 1

A mixture of 25 parts of 4,4'-dihydroxydiphenylene sulphone, 26 parts of diphenyl carbonate and 0.0005 part of sodium ethylate is melted by stirring under a nitrogen atmosphere. When the melt reaches a temperature of about 160–200° C. the bulk of the phenol split off distills off under a pressure of 50 mm. mercury gauge. Then the pressure is reduced to 0.5 mm. mercury gauge and thus the reaction is continued at 250° C. until the high molecular weight product is obtained.

Example 2

Into a mixture of 75 parts of 4,4'-dihydroxydiphenylene sulphone, 610 parts of 2 N caustic soda and 150 parts of cyclohexanone, there are introduced 44.6 parts of phosgene at 20° C. within 2 hours and with stirring. After half an hour's further stirring the tough mass of polycarbonate formed is washed neutral in a kneading machine and then freed from solvent and water in a vacuum drying vessel. A high molecular colourless powder having a softening point of 200–210° C. and soluble e.g. in dimethylformamide, dioxane, tetrahydrofurane and cyclohexanone is obtained which can be worked up into films and other shaped bodies from solutions or melts.

Example 3

To a solution of 25.47 parts of 4,4'dihydroxydiphenylene sulphone in 38.3 parts of absolute pyridine and 200 parts of absolute dioxane, a solution of 10.39 parts of phosgene in 120 parts of absolute dioxane is added dropwise with stirring at 0° C. in 45 minutes. Stirring is continued for 2 further hours at 0° C. and for 15 hours at room temperature. The mixture is filtered from the polycarbonate and pyridine hydrochloride, washed first with dilute hydrochloric acid and then neutral with water. The dried powder can be worked up into films and shaped bodies from solutions and melts.

Example 4

71.5 parts of phosgene are introduced with stirring at 20° C. over a period of 2 hours into a mixture of 123.8 parts of 2,2'-(4,4'-dihydroxydiphenylene)-propane, 15.8 parts of 4,4'-dihydroxydiphenylene sulphone, 100 parts of water, 313 parts of methylene chloride, 70.5 parts of sodium hydroxide and 0.12 part of sodium dithionite. 3 parts of triethylbenzyl ammonium chloride are added. After about 1 hour's further stirring the organic solution becomes highly viscous. It is washed neutral with water in the kneading machine. After evaporation of the solvent, a high molecular clear colourless resin remains, soluble, for example, in methylene chloride, chloroform, ethylene chloride, dioxane, tetrahydrofurane and dimethylformamide, and can be worked up from solutions and from the melt to films and other shaped bodies.

Example 5

71.5 parts of phosgene are introduced with stirring at 20° C. within 2 hours into a mixture of 96.3 parts of 2,2-(4,4'-dihydroxydiphenylene)-propane, and 47.3 parts of 4,4'-dihydroxydiphenyl sulphone, 700 parts of water, 600 parts of methylene chloride, 70.5 parts of sodium hydroxide, and 0.12 part of sodium dithionite. After adding 3 parts of triethylbenzyl ammonium chloride the organic solvent becomes highly viscous in about an hour. It is washed neutral with water in the kneading machine. After evaporating the solvents, a hard, elastic, colourless, high molecular resin remains which is soluble for example in methylene chloride, chloroform, ethylene chloride, dioxane, tetrahydrofurane, and dimethylformamide and can be worked up from solutions and from the melt to films and other shaped bodies.

Example 6

47.5 parts of absolute pyridine are dropped by stirring at 0–5° C. into a mixture of 75 parts of bis-(4,4'-phenylenechlorocarbonate)-sulphone, 23.6 parts of hexanediol-1,6, and 500 parts of methylene chloride. After stirring for further 20 hours at room temperature and after washing the reaction mixture with water for removing the formed pyridine hydrochloride and then with 2-N-hydrochloric acid for removing the excess of the pyridine the solution of the reaction product in methylene chloride is dried by sodium sulphate. After evaporating the solvent a colourless, tough resin is obtained with a K-value of 42.5 and a softening range of 160–180° C., soluble in methylene chloride, chloroform, acetone, and cyclohexanone.

We claim:

1. A solid thermoplastic linear polycarbonate resin in which carbonic acid is linearly esterified with a dihydroxydiarylene sulphone and a bis-hydroxyarylene alkane, the sulphone being selected from the class consisting of unsubstituted and alkyl-substituted dihydroxyarylene sulphones in which the alkyl substituents have up to four carbons each.

2. A solid, thermoplastic, linear polycarbonate resin suitable for the production of films, coatings and shaped articles with improved properties, said polycarbonate resin being obtained by linearly polyesterifying a mixture of a dihydroxy diarylene sulfone selected from the group consisting of unsubstituted dihydroxy diarylene sulfones and nuclearly-substituted dihydroxy diarylene sulfones in which the substituents are alkyl groups having up to 4 carbon atoms each, and up to about 1000 mol percent, related to said dihydroxy diarylene sulfones of a dihydroxy compound selected from the group consisting of aliphatic glycols with a chain length from 6–14 chain members, the xylylene glycols, the cyclohexane diols, 2,2-(4,4'-dihydroxy-dicyclohexyl)-propane, 2,6-dihydroxy-decahydronaphthalene, the dihydroxy benzenes, the dihydroxy-diphenyls, the dihydroxy-dinaphthalenes, dihydroxyanthracene, the hydroxy benzyl alcohols, and dihydroxy diarylene alkanes, with about equivalent amounts of a member selected from the group consisting of (1) a derivative of carbonic acid selected from the group consisting of dialkyl carbonates, the alkyl groups of which have up to 8 carbon atoms, dicyclohexyl carbonate, diphenyl carbonate, and ditoluyl carbonate, mixed dicarbonates of aliphatic, cycloaliphatic and aromatic monohydroxy compounds of the aforesaid kind, mixed bis-carbonates of monohydroxy compounds of the aforesaid kind and of the aforesaid sulfones and the aforesaid dihydroxy compounds, in the melt in the temperature range from about 50 to about 330° C., and (2) a bis-chlorocarbonic acid ester of the aforesaid sulfones and the aforesaid dihydroxy compounds, and of phosgene, in hydrochloride-binding solutions in the temperature range from about 0° to about 110° C.

3. The solid thermoplastic linear polycarbonate resin of claim 2 in which the sulphone is 4,4'-dihydroxydiphenylene sulphone.

4. The solid thermoplastic linear polycarbonate resin of claim 2 in which the sulphone is 4,4'-dihydroxydiphenylene sulphone, and the other dihydroxy compound is 2,2-(4,4'-dihydroxydiphenylene)-propane.

5. A solid thermoplastic linear polycarbonate resin in which carbonic acid is linearly esterified with a dihydroxydiarylene sulphone selected from the class consisting of unsubstituted and alkyl-substituted dihydroxyarylene sulphones in which the alkyl substituents have up to four carbons each.

6. A linear high molecular weight resinous polycarbonate of a compound of the formula:

$$HO—Ar—SO_2—Ar—OH$$

wherein Ar is an aromatic hydrocarbon radical.

7. A linear, high molecular weight, resinous carbonate copolymeric product of the interaction of reactants consisting essentially of (1) a carbonate precursor and (2) at least two different dihydric phenols, one of said dihydric phenols containing at least two aromatic groups bonded to each other by means of a sulfone linkage, and the other of said dihydric phenols being selected from the group consisting of monoaromatic phenols and polyaromatic phenols, the aromatic groups of which are bonded to each other by an alkylidene group; the sole reactive groups in said two different dihydric phenols being hydroxyl groups.

References Cited by the Examiner

UNITED STATES PATENTS

| | | | |
|---|---|---|---|
| 1,756,819 | 4/1930 | Ellis et al. | 260—47 |
| 2,035,578 | 3/1936 | Wagner | 260—77.5 |
| 2,210,817 | 8/1940 | Peterson | 260—77.5 |
| 2,455,653 | 12/1948 | Bralley et al. | 260—463 |
| 2,762,789 | 9/1956 | Fisher et al. | 260—47 |

FOREIGN PATENTS 532,543  10/1954  Belgium.

OTHER REFERENCES

Simonds et al.: Handbook of Plastics, D. Van Nostrand Company, New York, 2nd. ed. 1949, pages 549–551.

WILLIAM H. SHORT, *Primary Examiner.*

MILTON STERMAN, PHILIP E. MANGAN, LOUISE P. QUAST, R. J. BUTTERMARK, F. L. JABAS, T. L. TULLY, J. E. MUETH, R. A. BURROUGHS,
*Examiners.*